Dec. 1, 1931.   V. MULHOLLAND   1,834,631
APPARATUS FOR MAKING GLASS
Filed Dec. 5, 1928
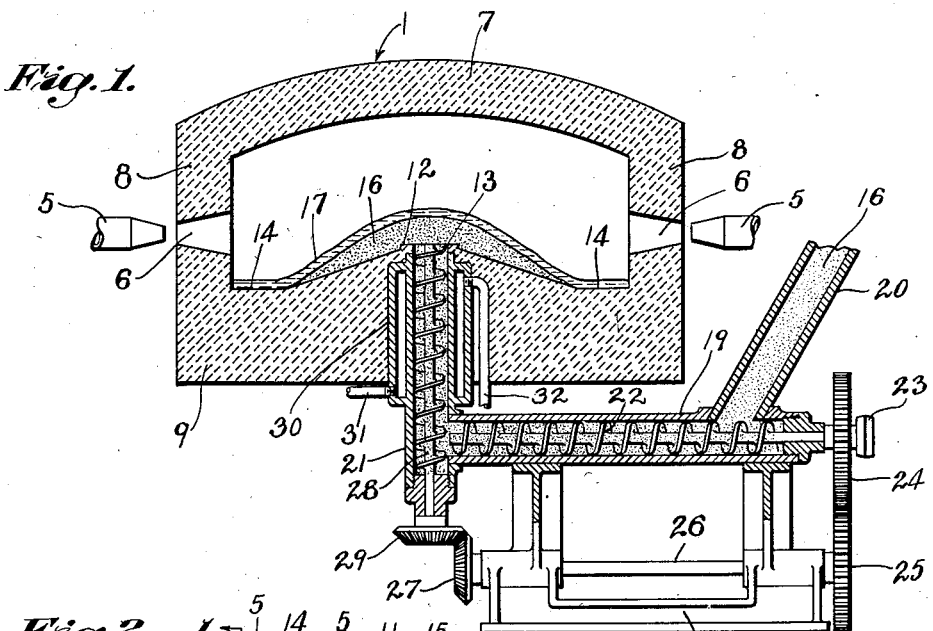
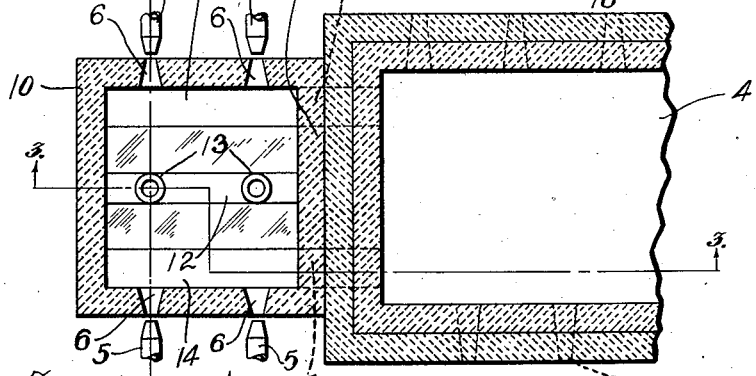
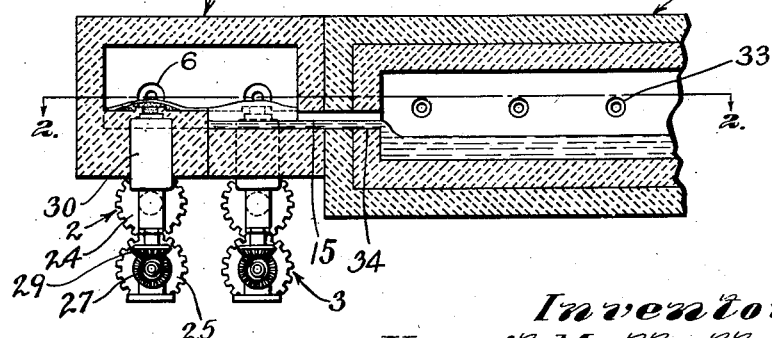

Patented Dec. 1, 1931

1,834,631

UNITED STATES PATENT OFFICE

VERGIL MULHOLLAND, OF WEST HARTFORD, CONNECTICUT, ASSIGNOR TO HARTFORD-EMPIRE COMPANY, OF HARTFORD, CONNECTICUT, A CORPORATION OF DELAWARE

APPARATUS FOR MAKING GLASS

Application filed December 5, 1928. Serial No. 323,942.

My invention relates to the art of making glass and to apparatus for continuously producing from glass batch, melted glass of a character suited to be subsequently formed into glassware, and more particularly to a device for feeding batch to the melting chamber or furnace of such glass producing apparatus and to apparatus for melting the batch in the chamber and delivering the glass therefrom.

An object of this invention is the provision of a device which is adapted to feed glass making batch up into the melting chamber directly from below at any desired point or points. A further object is to provide a melting surface with one or more elevations thereon from which the surface slopes so that the glass may melt and flow down as it becomes melted. A further object is the provision of a plurality of such elevations in the melting chamber so that the glass batch may be more uniformly distributed throughout the melting chamber and greater efficiency in the action of the heat may be obtained.

Further objects will be apparent from a reading of the subjoined specification and claims and from a consideration of the accompanying drawings, showing one embodiment of my invention in which:

Figure 1 is a view in vertical section taken on the line 1—1 of Fig. 2;

Fig. 2 is a horizontal section of the device taken on the line 2—2 of Fig. 3;

Fig. 3 is a vertical section taken on the line 3—3 of Fig. 2.

In the general operation of this embodiment, glass making batch is fed down inclined chutes into horizontal passage-ways from which it is conveyed continuously by screws horizontally into vertical feeding cylinders. Other screws in these last named cylinders force the material upwardly into the melting chamber through the bottom of the chamber. Flames playing upon the material in the melting chamber, melt the top layer thereof, which flows by gravity and out through openings from the melting chamber into a refining chamber.

Referring to Figs. 1 and 3 of the drawings, my improved melting chamber 1 is arranged to be fed from beneath by a plurality of feeding means, such as 2 and 3, and to cause the melted glass to flow into the refining chamber 4. Burners 5 are arranged to project flames through the openings 6 in the melting chamber 1 to play upon the batch in the interior of the melting chamber, and thus melt the batch therein.

The melting chamber 1 may be generally of the construction shown in my prior application, Serial No. 169,213. It may have an arched roof 7, sides 8 through which the burner openings 6 extend, a floor 9 and end walls 10 and 11. The upper or interior surface of the floor 9 may be formed with an elevation or elevations. In the embodiment illustrated, a ridge 12 extends longitudinally substantially along the center of the floor of the chamber, and feeding openings 13 are arranged to extend upwardly through this ridge.

The feeding means 2 and 3 supply batch through these feeding openings. The floor 9 slopes downwardly from this ridge 12 toward the sides of the chamber and forms adjacent to the sides of the chamber and parallel to the ridge a pair of gutters or depressions 14. These gutters in turn slope downwardly toward the exit end of the melting chamber to outlet openings 15. The glass batch 16, being fed in through the openings 13, is melted by the flames from the burners 5 and forming a film of melted glass 17 flows down from the ridge into the gutters 14 continuing downwardly therein to the outlet openings 15 and through these outlet openings into the refining chamber 4.

The feeding devices 2 and 3 are substantially alike and each comprises a support 18 carrying a horizontal cylinder 19 which is connected near one end with a sloping cylinder or chute 20 and is connected at its opposite end with a vertical feeding cylinder 21. The chute 20 is connected with a source of supply (not shown) of glass making batch 16 which flows downwardly therethrough into the cylinder 19. Cylinder 19 encloses a screw conveyor 22 driven by a pulley 23 secured to the end of the conveyor shaft opposite to the cylinder 21, which conveyor forces the batch toward the cylinder 21 and into that cylinder. The shaft of the screw 22 has also secured thereto adjacent the pulley 23, a pinion 24 which meshes with a similar pinion 25 on a shaft 26 journaled in the support 18. On the opposite end of this shaft from the pinion 25 is a bevel gear 27. The cylinder 21 encloses a screw conveyor 28 similar to the screw conveyor 22, the shaft of which conveyor carries at its lower end a bevel gear 29, meshing with the bevel gear 27. The batch which is fed into the cylinder 21 by the screw conveyor 22 is forced upwardly by the conveyor 28. The batch being raised by the conveyor 28 is forced through the associated opening 13 into the melting chamber 1 and there is melted as previously described.

Each cylinder 21 has formed integral with it and adjacent its upper end, a water jacket 30 having an inlet pipe 31 and an outlet pipe 32 connected to the lower end and the upper end of the jacket respectively. The opening 13 mentioned above is formed in the bottom wall of the tank 1 to receive the cylinder 21 and the water jacket 30. Cooling fluid forced into the water jacket 30 flows through the jacket and thus keeps the cylinder 21 and the conveyor 28 cool so that the batch therein will not become partly melted and clog.

The refining chamber 4 may be of any usual construction preferably, however, as shown in my aforesaid prior application, and has openings 33 for burners, and openings 34 for the inlet of the glass, which openings 34 register with the outlet openings 15 of the melting chamber.

The operation of a device will be readily understood. Glass making batch 16 is continuously supplied to the passage ways 20 and flowing by gravity into the cylinders 19 is forced by the conveyors 22 into the cylinders 21. The conveyors 28 therein force the material up through the openings 13 into the bottom of the melting chamber. Heat applied by the burners 5 acting on the surface of the material raised into the melting chamber, melts the upper layers of the material. The gases formed by the combustion pass out through stacks (not shown). The melted glass flows down from the ridge on both sides, covering the unmelted material and flowing into the gutters or depressions 14. It then flows downward toward the refining chamber and through the openings 15 and 34 into the refining chamber where it is refined for the fabrication of glassware. A cooling medium circulated through the pipes 31 and 32 and the jackets 30 serves as means for keeping the material and conveyors cool so that the conveyors will not be clogged by partly melted batch. The piles of unmelted batch in the chamber also serve as heat insulation and protect the batch feeders from heat and from melted glass.

It is to be understood that the above described embodiment of the invention is for the purpose of illustration only and various changes may be made therein without departing from the spirit and scope of the invention.

I claim:

1. In apparatus for making glass from glass batch, the combination of a melting chamber having a floor, and means for feeding batch upwardly through the floor of said chamber.

2. In apparatus for the production of glass from glass batch, a melting chamber having a batch feeding opening in the bottom thereof.

3. In apparatus for the production of glass from glass batch, a melting chamber having a plurality of batch feeding openings in its bottom.

4. In apparatus for the production of glass from glass batch, a melting compartment having a floor, means for supplying batch upwardly through the floor to the melting compartment to form piles on the floor thereof, means for supplying heat to the upper surfaces of said piles to melt the batch, and means for directing the glass so made to a refining chamber.

5. In apparatus for the production of glass from glass batch, the combination of a melting chamber having a floor, and means for feeding batch into said chamber comprising a conveyor for forcing batch upwardly through the floor.

6. In apparatus for the production of glass from glass batch, the combination of a melting chamber having a floor provided with an elevation, and means for feeding batch upwardly through the elevation onto the bottom of the chamber.

7. In apparatus for the production of glass from glass batch, the combination of a melting chamber having a floor with a raised portion and with adjacent portions of the floor sloping downward from said raised portion, and means for feeding batch upward through said raised portion into the melting chamber.

8. In apparatus for producing glass from glass batch, the combination of a melting chamber having a floor and a batch feeding opening in the said floor, and means for feeding glass batch upwardly through said opening.

9. In apparatus for making glass from glass batch, the combination of a melting chamber having a floor, the floor having an inlet hole in a line along substantially the center thereof, means for feeding glass batch upwardly through said hole, and means for cooling the batch as it is fed upwardly.

10. In apparatus for producing glass from glass batch, the combination of a melting chamber having a floor, and means for feeding the glass batch upwardly through the floor of said chamber at a plurality of points.

11. In apparatus for making glass from glass batch, the combination of a melting chamber, means for applying heat to the interior of said chamber, means for feeding glass batch upwardly into said chamber through the bottom thereof and outlet openings for the discharge of glass from the chamber.

12. In apparatus for making glass from glass batch, a melting chamber having a floor and sides, a ridge in the floor, a hole extending through the floor and through the ridge, means for feeding batch through the hole, depressions in the floor near the sides of the chamber, the floor sloping gradually from the ridge toward the depressions.

13. In apparatus for making glass from glass batch, the combination of a melting chamber having a floor, and having a plurality of holes in the said floor, and means for feeding batch upwardly through the said holes.

14. In apparatus for making glass from glass batch, the combination of a melting chamber, a floor therein, a ridge on said floor, means to feed glass upwardly through said ridge, means to melt the glass so fed in the said melting chamber, and means to collect said glass as it flows from said ridge.

15. In apparatus for making glass from glass batch, a melting chamber comprising a floor and sides, an elevation in said floor, and means to feed glass batch to said melting chamber through said elevation.

16. In apparatus for making glass from glass batch, a melting chamber comprising a floor, an elevation in said floor, means to feed batch through said elevation, and means causing melting of the batch and flowing of the batch from the elevation.

17. In apparatus for making glass from glass batch, a melting chamber comprising a floor, an elevation in said floor, means to feed glass batch through said elevation, and means to cool said feeding means.

18. In apparatus for making glass from glass batch, a melting chamber comprising a floor, a ridge in said floor, a plurality of holes in said ridge, and means to feed glass batch through said ridge to said floor.

19. In apparatus for making glass from glass batch, a melting chamber comprising a floor, a plurality of elevations in said floor, and means to feed glass batch through each of said elevations to said floor.

Signed at Hartford, Conn., this 30th day of November, 1928.

VERGIL MULHOLLAND.